United States Patent
Joseph et al.

(10) Patent No.: US 8,749,621 B2
(45) Date of Patent: Jun. 10, 2014

(54) VOLUMETRIC PROJECTION DEVICE

(75) Inventors: Daniel M. Joseph, Los Angeles, CA (US); Mark A. Reichow, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 683 days.

(21) Appl. No.: 12/909,955

(22) Filed: Oct. 22, 2010

(65) Prior Publication Data

US 2012/0098941 A1    Apr. 26, 2012

(51) Int. Cl.
*H04N 13/02* (2006.01)

(52) U.S. Cl.
USPC ............................................. 348/51; 353/7

(58) Field of Classification Search
USPC .................................................. 348/51; 353/7
See application file for complete search history.

(56) References Cited

U.S. PATENT DOCUMENTS

| | | | | |
|---|---|---|---|---|
| 3,804,504 A | * | 4/1974 | Scott | 353/77 |
| 3,944,734 A | * | 3/1976 | Ogawa | 348/788 |
| 4,580,880 A | * | 4/1986 | Watson | 359/855 |
| 5,954,414 A | * | 9/1999 | Tsao | 353/7 |
| 7,537,345 B2 | * | 5/2009 | Refai et al. | 353/7 |
| 8,328,361 B2 | * | 12/2012 | O'Connell et al. | 353/10 |

* cited by examiner

*Primary Examiner* — Sath V Perungavoor
*Assistant Examiner* — Jeffery Williams
(74) *Attorney, Agent, or Firm* — Marsh Fischmann & Breyfogle LLP; Kent A. Lembke

(57) ABSTRACT

A three-dimensional (3D) display device creating 3D illusions or effects within a contained space or volume. The device includes a front sidewall providing a viewing window to an interior of the display device. The device includes a transparent rear projection screen with a front surface facing the viewing window that is spaced apart a distance from the front sidewall. A media source projects a two dimensional (2D) image onto a back surface of the projection screen in a direction that is oblique to the front sidewall. The projection screen is positioned such that the front surface is angled away from the front sidewall, whereby the front surface is oblique to the viewing window. A leading edge of the projection screen is proximate to the front sidewall and a trailing edge of the projection screen is distal to the front sidewall with the front surface angled away from the front sidewall.

16 Claims, 6 Drawing Sheets

VOLUMETRIC PROJECTION DEVICE

BACKGROUND

1. Field of the Description

The present description relates, in general, to the illusion of stereoscopic or three dimensional (3D) image generation and/or projection, and, more particularly, to systems and methods for producing 3D or volumetric images without requiring viewers to wear 3D glasses or the like. The described devices may be thought of as providing volumetric displays or projected images that create a 3D display within a small space or container (such as a volumetric projection illusion lantern).

2. Relevant Background

There is a growing trend toward using 3D projection techniques in theatres and in home entertainment systems including video games and computer-based displays. In many conventional 3D projection techniques, the right eye and the left eye images are delivered separately to display the same scene or images from separate perspectives so that a viewer sees a three dimensional composite, e.g., certain characters or objects appear nearer than the screen and other appear farther away than the screen. Stereoscopy, stereoscopic imaging, and 3D imaging are labels for any technique capable of creating the illusion of depth in an image. Often, the illusion of depth in a photograph, movie, or other two-dimensional image is created by presenting a slightly different image to each eye or the creation of parallax. In most animated 3D projection systems, depth perception in the brain is achieved by providing two different images to the viewer's eyes representing two perspectives of the same object with a minor deviation similar to the perspectives that both eyes naturally receive in binocular vision.

The images or image frames used to produce such a 3D output are often called stereoscopic images or a stereoscopic image stream because the 3D effect is due to stereoscopic perception by the viewer. A frame is a single image at a specific point in time, and motion or animation is achieved by showing many frames per second (fps) such as 24 to 30 fps. The frames may include images or content from a live action movie filmed with two cameras or a rendered animation that is imaged or filmed with two camera locations. Stereoscopic perception results from the presentation of two horizontally offset images or frames with one or more object slightly offset to the viewer's left and right eyes, e.g., a left eye image stream and a right eye image stream of the same object. The amount of offset between the elements of left and right eye images determines the depth at which the elements are perceived in the resulting stereo image. An object appears to protrude toward the observer and away from the neutral plane or screen when the position or coordinates of the left eye image are crossed with those of the right eye image (e.g., negative parallax). In contrast, an object appears to recede or be behind the screen when the position or coordinates of the left eye image and the right image are not crossed (e.g., a positive parallax results).

Many techniques have been devised and developed for projecting stereoscopic images to achieve a 3D effect. One technique is to provide left and right eye images for a single, offset two-dimensional image and displaying them alternately, e.g., using 3D switching or similar devices. A viewer is provided with liquid crystal shuttered spectacles to view the left and the right eye images. The shuttered spectacles are synchronized with the display signal to admit a corresponding image one eye at a time. More specifically, the shutter for the right eye is opened when the right eye image is displayed and the liquid crystal shutter for the left eye is opened when the left eye image is displayed. In this way, the observer's brain merges or fuses the left and right eye images to create the perception of depth.

Another technique for providing stereoscopic viewing is the use of anaglyphs. An anaglyph is an image generally consisting of two distinctly colored, and preferably, complementary colored, images. The theory of anaglyph is the same as the technique described above in which the observer is provided separate left and right eye images, and the horizontal offset in the images provides the illusion of depth. The observer views the anaglyph consisting of two images of the same object in two different colors, such as red and blue-green, and shifted horizontally. The observer wearing anaglyph spectacles views the images through lenses of matching colors. In this manner, the observer sees, for example, only the blue-green tinted image with the blue-green lens, and only the red tinted image with the red lens, thus providing separate images to each eye. The advantages of this implementation are that the cost of anaglyph spectacles is lower than that of liquid crystal shuttered spectacles and there is no need for providing an external signal to synchronize the anaglyph spectacles.

In other 3D projection systems, the viewer may be provided glasses with appropriate polarizing filters such that the alternating right-left eye images are seen with the appropriate eye based on the displayed stereoscopic images having appropriate polarization (two images are superimposed on a screen, such as a silver screen to preserve polarization, through orthogonal polarizing filters). Other devices have been produced in which the images are provided to the viewer concurrently with a right eye image stream provided to the right eye and a left eye image stream provided to the left eye. Still other devices produce an autostereoscopic display via stereoscopic conversion from an input color image and disparity map, which typically is created based on offset right and left eye images. While these display or projection systems may differ, each typically requires a stereographic image as input in which a left eye image and a slightly offset right eye image of a single scene from offset cameras or differing perspectives are provided to create a presentation with the appearance of depth.

There is a continuous desire and need to provide new techniques that provide cost effective but eye-catching content with depth and dimension. For example, it is desirable to grab the attention of crowds in shopping malls, on busy streets, in amusement parks, and other crowded facilities such as airports and entertainment arenas. As discussed above, 3D imagery is one exciting way to appeal to viewers and hold their attention. Unfortunately, the use of 3D imagery has, in the past, been limited by a number of issues. A large draw back or hurdle is that 3D projection technologies often require the viewer to wear special viewing glasses, which is often inconvenient for many applications and can significantly add to costs.

In some projection systems, an illusion of volume or a volumetric display is created using partially reflective mirrors tilted at various angles (e.g., at 45 degrees) to a viewer's point-of-view (POV), and an image plane is produced from a projection upon a front surface of a projection screen. However, such volumetric illusion systems require several components that can require considerable set up time and present added costs. In addition, the POV of the viewer is limited. These and other limitations force these systems to be only used in larger space applications (e.g., in a large set or display). In other cases, spinning liquid crystal displays (LCDs) with media played upon them are used, but such displays are very expensive and must be spun at high revolutions per minute, which can create safety issues. Hence, there remains a need for systems and methods for providing autostereoscopic, 3D, or volumetric displays in a cost effective manner, without the need for special eye or head wear, and in small spaces such as within a container (e.g., a lantern, a jar, a small box, or the like).

SUMMARY

The present description addresses the above problems by providing an autostereoscopic display system or 3D display device that creates a volumetric display using two dimensional (2D) media or content (e.g., a 2D laser or video from a projector). In some embodiments, the device includes a container (or 3D frame assembly) with a transparent front sidewall. A transparent rear projection screen is positioned within the interior space of the container at an oblique angle relative to the front sidewall. Note, though, the 3D display device may also be a free-air device and not include the container but merely support the rear projection screen in a display area or volume. A projector is used to project a 2D video or still image onto the rear surface of the projection screen, and a viewer has a line of sight into the interior space to view the projected 2D image via the front surface of the projection screen.

The positioning of the projection screen causes the projected or displayed image to be at two or more depths or distances away from the front sidewall. Such "depth" of the 2D image is combined with the viewer's concurrent viewing of foreground components (e.g., frame members of the container, the front sidewall which may be frosted or tinted, and the like) and background components (e.g., frame members of the container behind the displayed image, container portions visible through the transparent projection screen, and the like) to cause the viewer to perceive a rich 3D display without the need for 3D technologies such as viewing glasses or 3D projection devices/media content.

More particularly, a volumetric display device is provided for creating 3D illusions or effects within a contained space or volume. The device includes a front sidewall providing a viewing window to a viewer into the interior of the display device. Significantly, the device further includes a projection screen (such as a sheet of a transparent rear projection screen or similar product) with a front surface facing the viewing window but that is spaced apart a distance from the front sidewall to create depth. The device also includes a media source projecting a two dimensional (2D) image onto a back surface of the projection screen. In many embodiments, the media source is positioned so as to project onto the back surface in a direction that is oblique to the front sidewall, and the projection screen is positioned relative to the front sidewall such that the front surface is angled away from the front sidewall, whereby the front surface is oblique to the viewing window.

The display device creates depth for the displayed 2D image as a leading edge of the projection screen is proximate to the front sidewall and a trailing edge of the projection screen is distal to the front sidewall with the front surface angled away from the front sidewall at an angle of at least about 30 degrees. The screen may be planar or the projection screen may be curved or bowed outward away from the media source such that the front surface has an arched or arcuate cross section. Regarding depth, the 2D image may be projected onto the projection screen with a leading edge a first distance from the front sidewall and with a trailing edge a second distance from the front sidewall that is greater than the first distance such that the 2D image is projected with depth relative to the viewing window.

DETAILED DESCRIPTION OF THE PREFERRED EMBODIMENTS

Briefly, the following provides a description of an autostereoscopic, volumetric, or 3D projection device. The 3D projection (or display) device uses a video projector projecting 2D media or imagery, such as a 2D video image, onto a rear or back surface of a transparent film projection screen that is arranged at an oblique angle relative to a front surface of a container (or housing, enclosure, or 3D frame that contains the projection screen). In some cases, though, the projector may project the 2D media onto the front surface of the projection screen.

A viewer viewing the front surface or sidewall of the 3D frame sees the 2D image but with an illusion of depth or volume created by the combination of the 3D frame providing foreground images or frame of reference, a projected image at two or more distances behind or offset from these foreground images, and an oblique projection or media stream. In other words, the projector projects onto the back surface of the projection screen so that its output or projected content stream is not parallel to or in the viewer's line of sight so as to hide the source of the image.

Further, the projected image is typically at multiple distances from the front sidewall (or a window or viewing portal in such a sidewall) because the projection screen is positioned at an angle to the front sidewall (e.g., 30 to 60 degree or other non-parallel arrangements) such that a leading edge or portion of the screen is closer to the front sidewall (and viewer) than a trailing edge or portion of the screen. For example, a 2D snake could be projected on the projection screen with its head on the leading edge of the projection screen and tail on the trailing edge such that the head is at a first distance away from the front sidewall and viewer that is closer than the second distance where the tail is displayed to the viewer. In some embodiments, the projection screen is planar such that the distance changes along the projection screen at a constant rate while in other embodiments the project screen is curved or arched from the leading to trailing edge such that the distance between the projection screen (and a 2D projected image) and the front sidewall (of viewing window in such sidewall) varies at differing rates along the sidewall.

Figure 1:
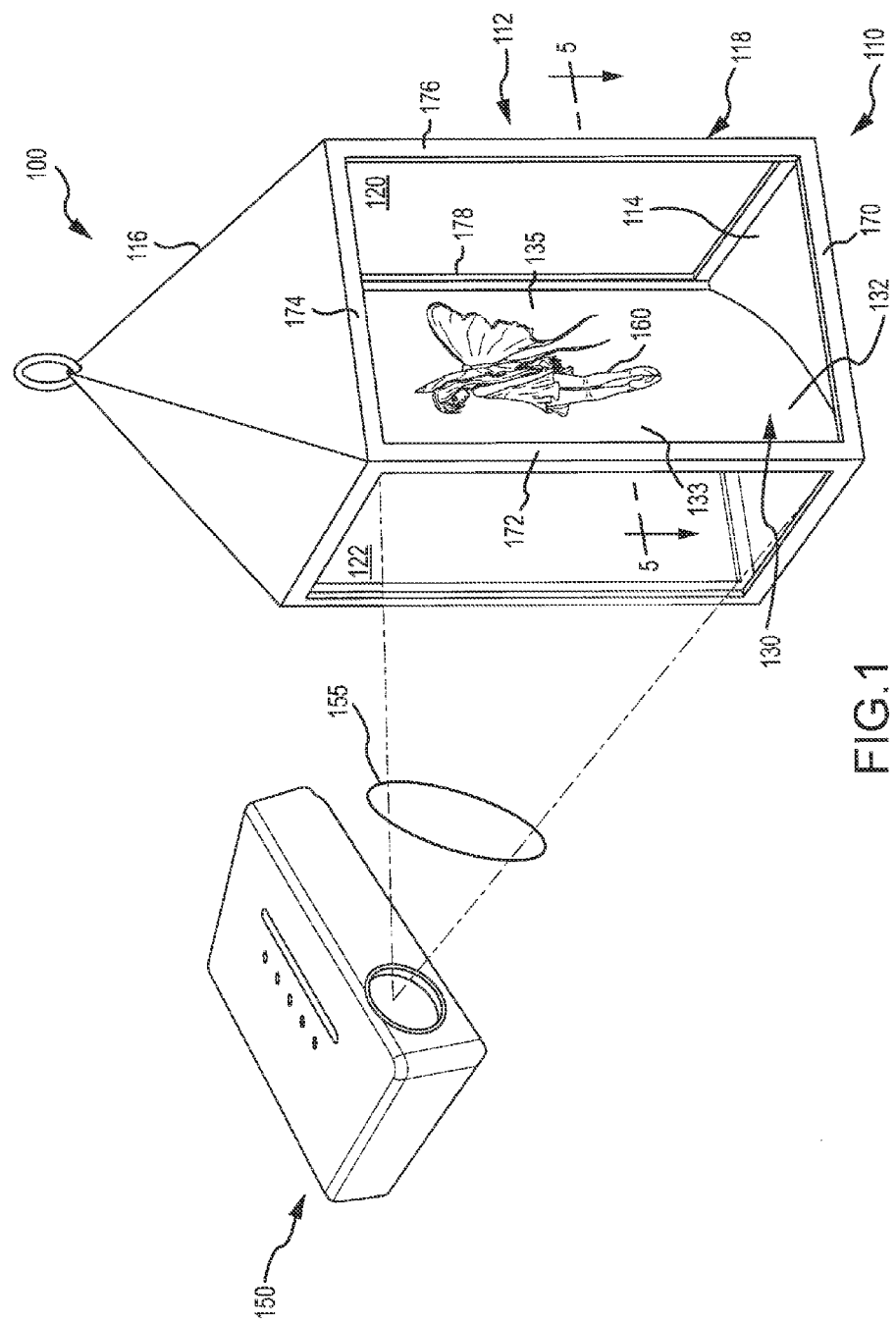
FIG. 1 illustrates an autostereoscopic or volumetric projection device of one embodiment showing use of a video projector projecting onto a rear or back surface of a transparent film projection screen that is arranged at an oblique angle relative to a front surface of a container (that contains the projection screen) to provide a 2D image with an illusion of depth or volume.

FIG. 1 illustrates a 3D or volumetric display device 100 for use in creating a 3D display using 2D media. The display device 100 includes a 3D frame (or housing, container or the like) 110 that includes a support assembly 112 that includes a base or bottom 114, a cover or top 116, and a frame assembly 118 extending from the base 114 to support the cover 116. The frame assembly 118 also defines a front sidewall or viewing window 120 and projection (or non-front/viewing) sidewalls 122. The sidewalls 120, 122 may simply be openings in the 3D frame 110 but, more typically, may be formed of a pane or sheet of a translucent to transparent material such as a plastic or glass that is transmissive to light to allow a viewer to view the interior volume of the container 110 via front sidewall 120 as well as to allow light to be projected into the container 110 via one or more of the sidewalls 122.

The frame assembly 118 may take many shapes and forms to support the viewing and projection sidewalls 120, 122 and to create foreground images/points of reference for a viewer. As shown, the frame assembly 118 is generally a three dimensional rectangular box with six sides, but other embodiments may have more or less sides and have differing shaped sidewalls (e.g., the front sidewall 120 defined by the frame assembly 118 may be square, triangular, another polygonal shape, circular, oval, or nearly any other shape providing a viewing portal or window into the interior of the 3D frame or container 110). The frame assembly 118 defines a front sidewall 120 (e.g., contains a pane of glass or plastic) that is rectangular with a bottom, a left, a top, and a right frame member or element 170, 172, 174, 176. To a viewer, these frame members 170, 172, 174, 176 provide a set of foreground images or points of reference for determining or perceiving a depth of an image 160 projected within the inner void or space of the 3D frame 110. In another embodiment, the frame assembly 118 has the form of a bird cage or similar arrangement with the front sidewall providing a front portion of the cage that may be made up of a wire mesh or bars of the cage that provide the foreground images and also transmit light to a viewer outside the cage.

The 3D display device 100 further includes a projection screen 130 positioned within the 3D frame or container 110. Specifically, the projection screen 130 is positioned within the 3D frame 110 so as to be offset from or spaced apart from the front sidewall 120 and the frame members 170, 174, 176 supporting (defining) the sidewall 120. To this end, the projection screen 130 may be a film or sheet of translucent to transparent projection material with a front surface 132 facing or proximate to the front sidewall or viewing window 120.

In some embodiments, as shown in FIG. 1, the projection screen 130 may be positioned within the inner volume or space of the 3D frame 110 at an angle relative to the front sidewall 120 (e.g., not parallel to the plane containing the sidewall 120 but instead at an oblique angle). This arrangement creates an enhanced 3D effect or illusion as differing portions of the screen 130 and an image 160 projected upon the screen 130 are at differing distances from the front sidewall 120 (differing depths relative to a viewer's eyes). To this end, a leading edge 133 of the projection screen 130 is shown to be near or adjoined with the left front frame member 172 while a trailing edge 135 of the screen 130 is shown to be near or adjoined with a rear frame member 178 (which is spaced apart from the right front frame member 176). Hence, the leading edge 133 of the screen 130 is proximate to the front sidewall 120 (e.g., at a first distance from or even coinciding with the sidewall 120) while the trailing edge 135 is distal to the front sidewall 120 (e.g., at a second distance greater than the first distance or even coinciding with a back or rear sidewall of the 3D frame 110).

As shown, the screen 130 may extend between corner frame members 172, 178 such that, in a rectangular frame 118 the surface 132 generally angles away from the front sidewall 120 at an angle of about 45 degrees. However, in other embodiments, the trailing edge 135 may extend to a point between the right front frame member 176 and the rear frame member 178 such that the angle is less than 45 degrees or may extend to or toward a rear sidewall such that the angle is greater than 45 degrees. For example, it is likely that angles between about 20 and 70 degrees may be useful (e.g., 30 to 60 degrees with 40 to 50 degrees being more useful in some applications). Also, the screen 130 may not extend fully across the inner space of the container 110 in some embodiments. The screen 130 may be supported within the container 110 at a distance apart from the sidewall 120 and, typically, at an oblique angle to add or provide depth to the displayed image 160. Depth may further be provided by having the screen 130 and front or display surface 132 arched from leading to trailing edge 133, 135 (e.g., a large radius of curvature or gradual bend) so as to better hide the existence of the screen 130 and create a desirable projected image 160 (e.g., with depths or distances from the front sidewall 120 that vary in a desired way (not linear change in depth as is the case in the real world)).

The display device 100 further includes a projector or 2D image source 150 that provides 2D media or content 155. In some embodiments, the 2D media or content 155 is a 2D still or video image that is projected upon a rear surface of the projection screen 130 and produces the displayed or projected image 160 visible on or through the front surface 132 of the screen 130 to a viewer looking through the front sidewall 120. The 2D image source 150 may be any of a number of conventional and readily available video projectors, and its specific implementation is not limiting to the invention. For example, the projector 150 may be a Casio XJ-A230 DLP WXGA Laser & LED hybrid projector, an LG HX3000 LED video projector, or the like.

The projector or source 150 may be externally located relative to the frame assembly 118 or may be positioned within (or built in) the container 110. The projector 150, as shown, projects through a rear (or non-front or viewing sidewall 120) sidewall 122 at an angle that is oblique to the front sidewall 120 such that the content or projection stream 155 is not projected directly into a viewer's eyes. For example, if the screen 130 is placed at a 45 degree offset angle relative to the front sidewall 120, the projector 150 projects the light 155 (2D video images) onto the rear surface of the projection screen 130 in a generally orthogonal or at least transverse manner such that the stream 155 is also at an oblique angle to the front sidewall 120 (or plane containing such viewing window), e.g., at about 45 degrees or the like. The media 155 may be designed to concentrate or provide most of the visible light in the area of displayed or projected image 160 to limit blow by and limit lighting/illuminating portions of the front surface 132 not used to display the image 160 (e.g., via masking or the like).

In some cases, a minor (not shown in FIG. 1) may be positioned to bounce light in a desired manner such as by being positioned on an opposite side of the screen 130 than the projector 150 to direct light that blows by or through the screen 130 back onto the screen or into the container 110 (e.g., with a low or high positioned projector relative to the viewer's line of sight and the screen 130 and a high or low mirror(s) reflecting light back into the container/onto the screen 130 (e.g., its front surface when rear projected).

The projection screen 130 may be any of a number of translucent to "transparent" projection films. These films generally are formed of plastic materials that are substantially transparent but that include particulates so as to be useful as a projection screen (e.g., a rear projection screen as shown in FIG. 1). Such transparent film projection screens allow objects behind the screen 130 to be visible to a viewer through the screen 130 such as the frame assembly 118, base 114, and top or cover 116. In some cases, such transparency is only provided when the projector 150 is not operating while in other cases the viewer can see through the screen 130 when the image 160 is displayed in areas/portions of the surface 132 not used for image 160. In one embodiment, the screen 130 is a rear projection screen from Kimoto Co., Ltd. (e.g., the DILAD™ Screen, Model T40Si or the like) that is configured for forward light scattering to render a bright image 160. Such films generally are thin and flexible allowing the screen 130 to be bent during installation into the 3D frame 110 to be curved or arched (e.g., bow outward away from or arch toward the projector 150) as shown in FIG. 1.

Figure 2:
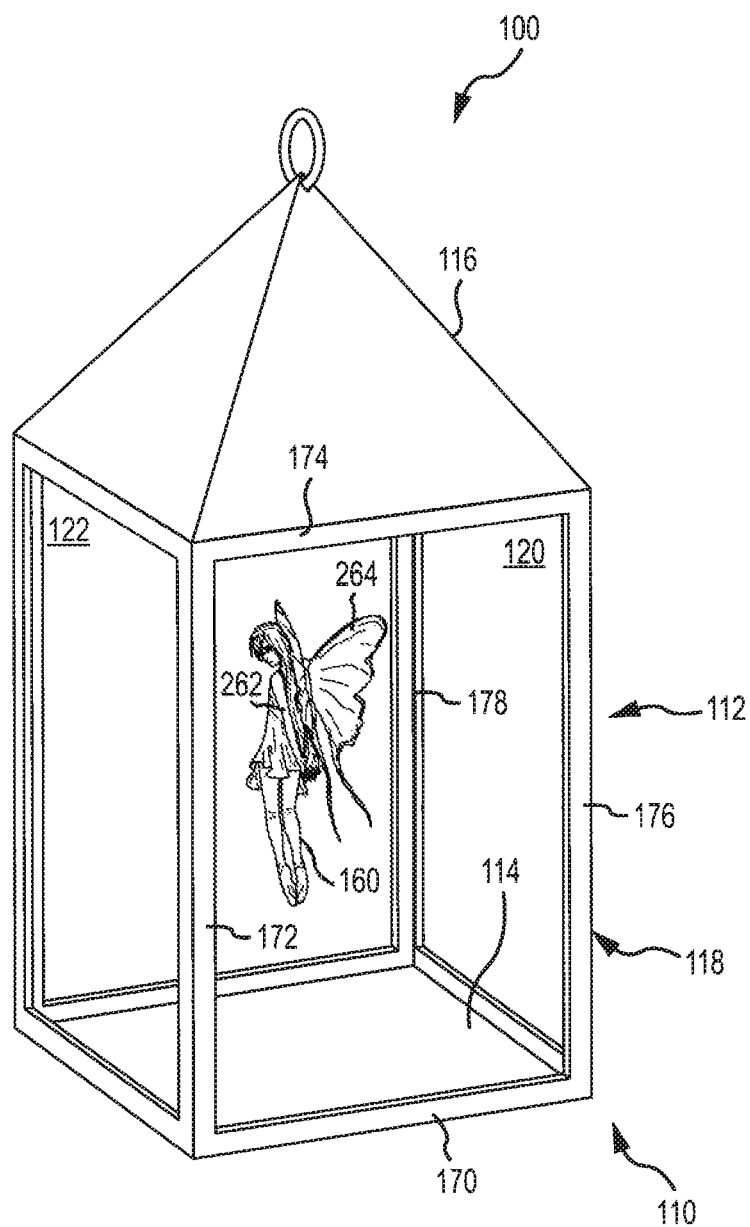
FIG. 2 illustrates the volumetric projection device of FIG. 1 showing its appearance to a viewer when in use such as with the projector and even the projection screen being hidden from view and the projected image floating in the interior volume or space of the container (e.g., 3D illusion lantern or the like)

FIG. 2 illustrates the display device 100 as it may appear in use to a viewer (not shown). The viewer views the device 100 mainly through front sidewall or viewing window 120. To the viewer, the projector 150 and display screen 130 are completely or substantially hidden from view. Further, the screen 130 is transparent such that the viewer is able to see portions of the 3D frame 110 behind the screen 130 such as the base 114, top 116, and/or frame assembly 118. The viewer also sees the displayed or projected image 160 but without seeing and/or perceiving the front surface 132 (and, in some embodiments, edges of the screen 130). Hence, the image 160 appears to be floating within the inner space or volume of the 3D frame 110. The image 160 is located at the front surface 132, though, so that it is spaced apart from the front sidewall 120 and frame members 170-176.

The frame members 170-176, the sidewall 120, and other features of the 3D frame 110 act as foreground images or elements while frame members and other features of the 3D frame 110 that are visible with the image 160 (e.g., through screen 130 or the like) acts as background images or elements. The foreground and background images provide a sense of depth to the 2D image 160. Further, the angling of the surface 130 causes a first portion 262 of the image 160 to be closer to the sidewall 120 than a second portion 264 (e.g., the fairy's left arm and wing is closer to the sidewall 120 and viewer than the right wing), which further creates depth in viewing the image 160 in the container 110. In one prototype, the inventors provided an image 160 in the form of a burning candle such that the display device 100 was useful as a volumetric projection illusion lantern (but with none of the safety concerns of a burning candle/flame).

Figure 3:
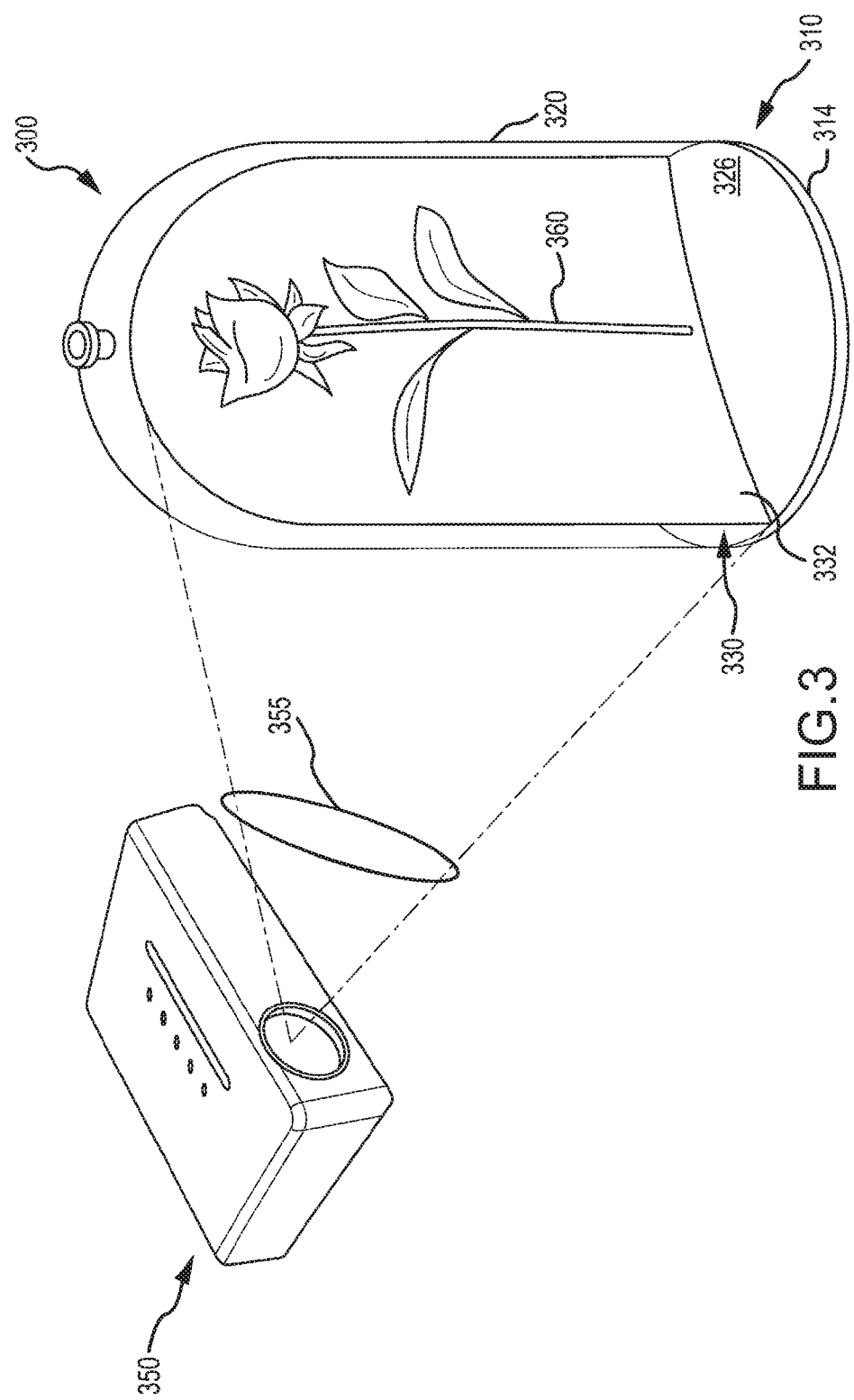
FIG. 3 illustrates another volumetric projection device of an embodiment similar to that of FIG. 1 but with a container or housing with a generally cylindrical sidewall defining an interior space or volume for containing the transparent film screen an angle relative to the front surface or portion of the sidewall, which defines a point of view for a viewer.

FIG. 3 illustrates another volumetric projection device 300. In the device, a projection screen 330 is positioned within the interior space or inner volume of a 3D frame or container 310. A projector 350 projects a 2D image stream 355 onto the back surface of the screen 330 such that a projected or displayed 2D image 360 is visible on front or display surface 332. In contrast to 3D frame 110, the frame 310 defines a cylindrical interior space with a circular base 314 and cylindrical sidewall 320. The cylindrical sidewall 320 is formed of a translucent to transparent material such as a plastic or glass, and the sidewall 320 provides a front sidewall or viewing window 326. Of course, the frame may also take many other forms to provide the sidewalls 320 and allow light to mass through such as a defined frame with or without transparent material such as birdcage or a sidewall 320 that is mesh or porous to allow light to pass to a viewer's eyes.

The front surface 332 faces the sidewall 326 but, as with 3D display device 100, the screen 330 is arranged to be non-parallel or oblique to the front sidewall 326. In other works, a viewer would have a line of sight that is generally orthogonal to sidewall 326, and the front surface 332 would angle away from a plane passing through sidewall 326. Stated differently, the angle between the line of sight for a viewer and the front surface 332 would be less than 90 degrees such as between 35 and 55 degrees or the like (e.g., about 45 degrees in some cases). The projector 350 is positioned such that the hot spot (or the area where the light rays from the proctor 350 are seen by a viewer) is not on the front sidewall 326 (or portion of sidewall 320 typically displayed to the viewer), e.g., the images 355 are projected onto the back surface of projection screen 330 that is angled away from the front sidewall 326. The edges for the transparent film projection screen 330 may abut the inner surfaces of sidewall 320 and such edges may be hidden, when desired, by frosting or other effects/elements provided on the sidewall 320 or the sidewall 320 may be substantially transparent throughout.

Figure 4:
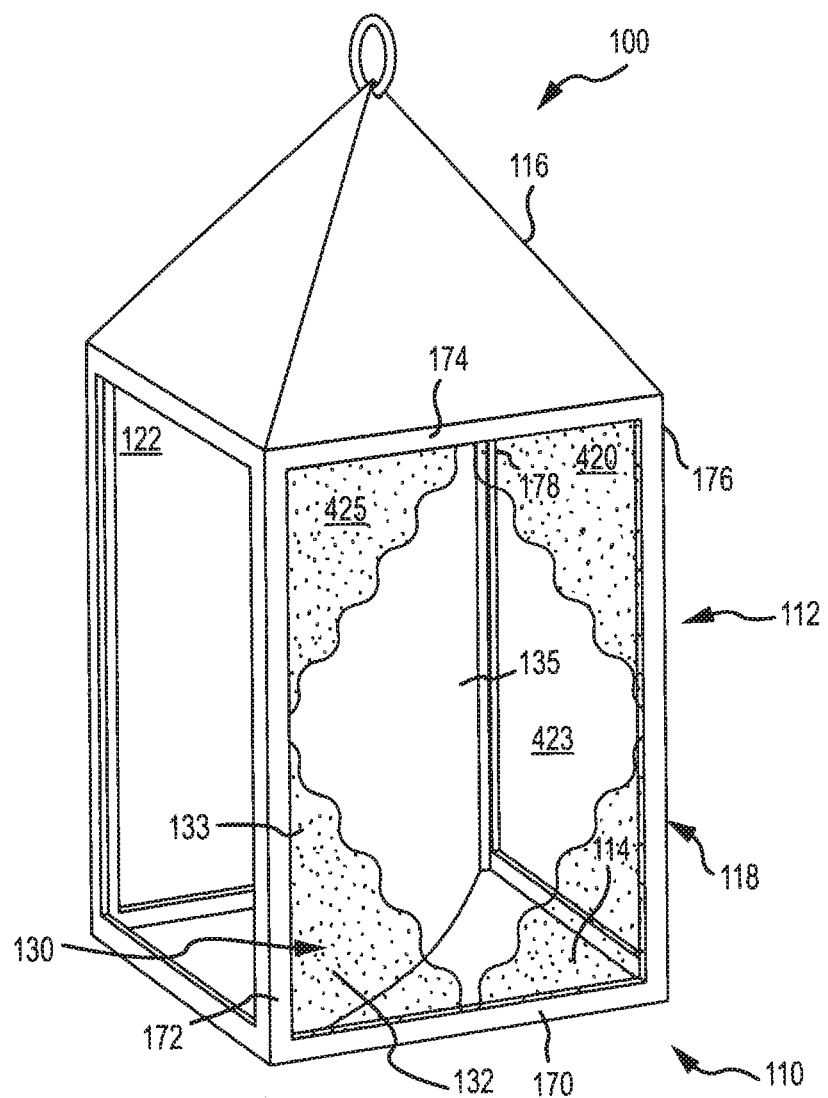
FIG. 4 shows the projection, screen container of FIG. 1 with the projector in an off state showing use of an alternate front sidewall or viewing window/portal that includes frosted or other foreground images/elements to further provide depth and/or hide edges of projection screen or film.

A number of techniques may be used to further disguise the presence of the substantially transparent projection screen 130. FIG. 4 illustrates the use of frosting or tinting of the front sidewall or viewing window to limit the light of sight of a viewer to portions of the display surface not used for an image. Specifically, FIG. 4 shows the display device 100 with a different or modified front sidewall 420 but with other features being the same (and the projector 150 and image 160 not shown to ease of explanation). As shown, the front sidewall 420 may be a pane or sheet of glass or plastic that includes an open viewing window or portal 423, which is substantially transparent.

The viewing window 423 may be centrally located and have irregular outer edges with its shape suiting the size of the image 160 (e.g., being slightly larger or smaller than such image 160). The sidewall 420 also includes a frosted or tinted/treated area 425 that at least partially blocks a viewer's line of sight into the inner volume of the container 110. The frosting of areas 425 also provides an additional foreground element that provides additional depth to, the image 160 (e.g., frosted area 425 is in front of and spaced apart from image 160 or surface 132).

The depth effect and disguising of edges and unused portions of projection screen 130 may be enhanced in other ways. The 3D frame 110 defines an inner volume or interior space. Some embodiments of the device 100 include set elements between the surface 132 and the sidewall 120, 420. For example, physical 2D or 3D objects may be positioned within container 110 but in front of the projection screen 130 so as to be seen concurrently with and in closer proximity than the image 160 on surface 132. In other cases, set elements may be positioned behind the screen 130 to be viewed through the screen 130 even when the image 160 is displayed by the projector 150 so as to provide additional depth to the image 160.

Figure 5:
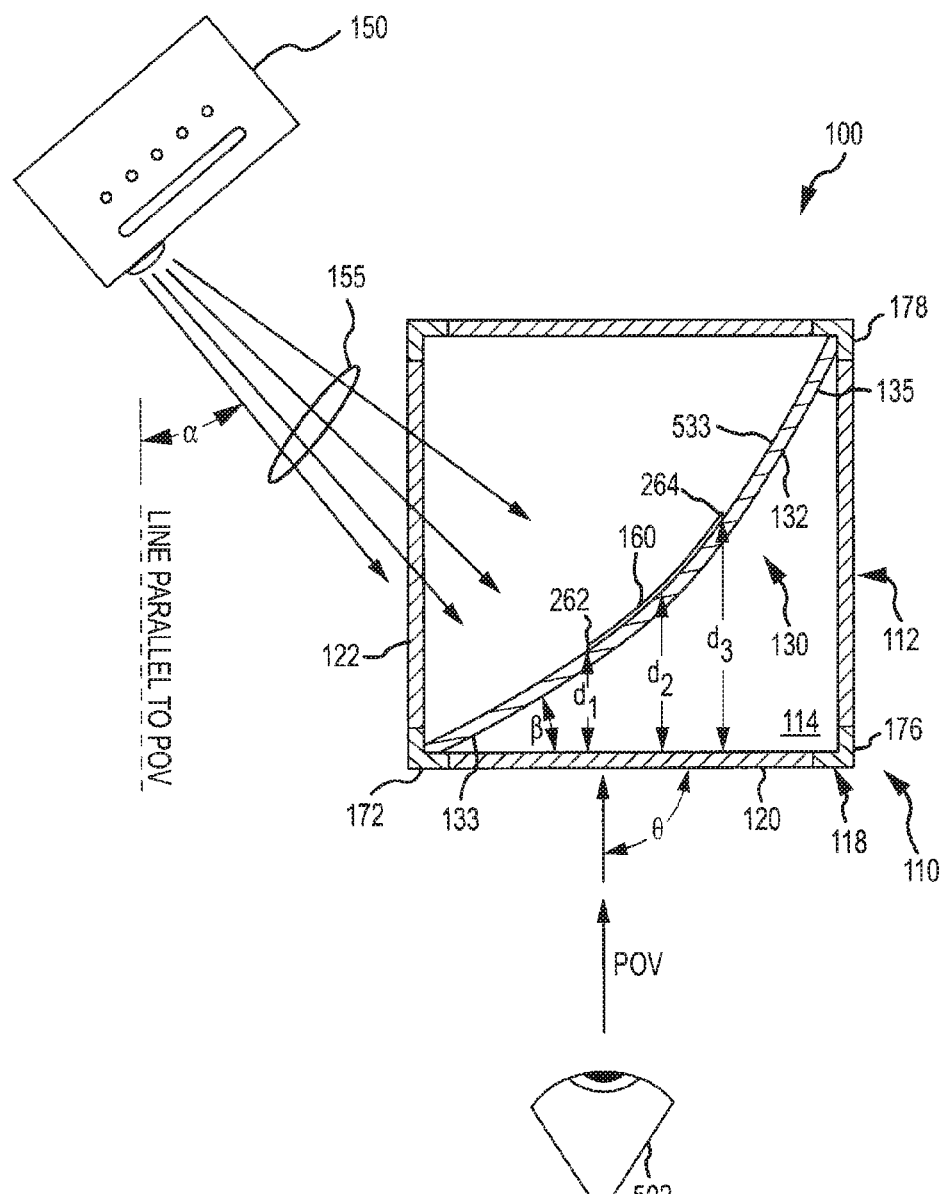
FIGS. 5 and 6 illustrate sectional views of the volumetric projection device of FIG. 1 taken at line 5-5 showing the positioning of the projection film relative to a front wall of the container, to the intended POV of a viewer of the container, and to the video projector, with FIG. 5 showing an embodiment using an arched screen and FIG. 6 showing an embodiment using a planar screen.

FIG. 5 is a sectional view of the display device 100 of FIG. 1 taken at line 5-5. For ease of explanation, the projected content 155 is shown to be projected through sidewall 122 onto the back surface 533 so as to provide or produce displayed/projected image 160. The projected stream 155 is projected generally at an angle, α, that is not parallel to the line of sight or point of view (POV) of the viewer 502 of the display device 100. Instead, the projection stream 155 (or its hot spot of rays) may be oblique at an angle, α, of 30 to 60 degrees or the like such as about 40 to 50 degrees and onto the back surface 533 of projection screen 130.

The screen 130 may be supported at a leading or first edge 133 by frame member 172 and at a trailing or second edge 135 by frame member 178 (diagonally opposite corner of assembly 118). This may result in the front surface 132 being at an angle, β, from the front sidewall or viewing window 120 of the 3D frame 110, such as at an angle of 30 to 60 degrees (e.g., angled inward into interior space at 40 to 50 degrees or the like). The front sidewall 120 may be transverse to the POV or line of sight of viewer 502 such as 70 to 110 degrees or the like with 85 to 95 degrees from sidewall 120 providing particularly desirable results. This arrangement results in the displayed image 160 appearing to have volume or depth to the viewer 502. This is achieved in part because the image 160 and projection screen 130 are offset a distance from the front sidewall 120 and also because the foreground components of 3D frame 110 such as frame member 176 are in front of the screen 130 and image 160 (while components of 3D frame 178 are also behind the image 160).

The 3D effect is enhanced because differing parts or portions of the image 160 are at differing distances from the viewer 502 due to the angled arrangement of the screen 130 relative to the front sidewall. Specifically, a leading or first portion 262 of the displayed image 160 is projected onto a first portion of the back surface 533 such that it is at a first distance, $d_1$, from the front sidewall 120. A center portion of the image 160 is projected on a second portion of the back surface 533 such that it is at a second distance, $d_2$, which is greater than the first distance, $d_1$. Further, a trailing or third portion 264 of the displayed image 160 is projected onto a third portion of the back surface 533 to be at a third distance, $d_3$, which is greater than the second distance, $d_2$.

The difference in these distances may be relatively small when the angle is small and/or the device 100 is small (e.g., less than 1 inch difference between d1 and d3) or be relatively large when the angle is larger, such as 45 degrees, and/or the container 110 is larger (e.g., sidewall 120 is 8 to 24 inches or more across so that the difference of distance from sidewall 120 between d1 and d3 may up to 1 to 6 inches or more). Hence, the 2D or "flat" image 160 is perceived as having depth or volume by a viewer 502 when viewed along the POV that is orthogonal to viewing window/surface 120 but oblique to surfaces 132, 533 of projection screen 130. The depth effect may be enhanced or changed by bending or bowing the screen 130 such that the rear and front surfaces 533, 132 of screen 130 are arched or curved relative to the POV of the viewer 502 (and relative to the projected image stream 155). Typically, this bend is gradual or the screen 130 has a large radius of curvature (e.g., 1 to several feet or more in some embodiments) so that the bending (and screen 130) is not readily perceived by the viewer 502.

Figure 6:
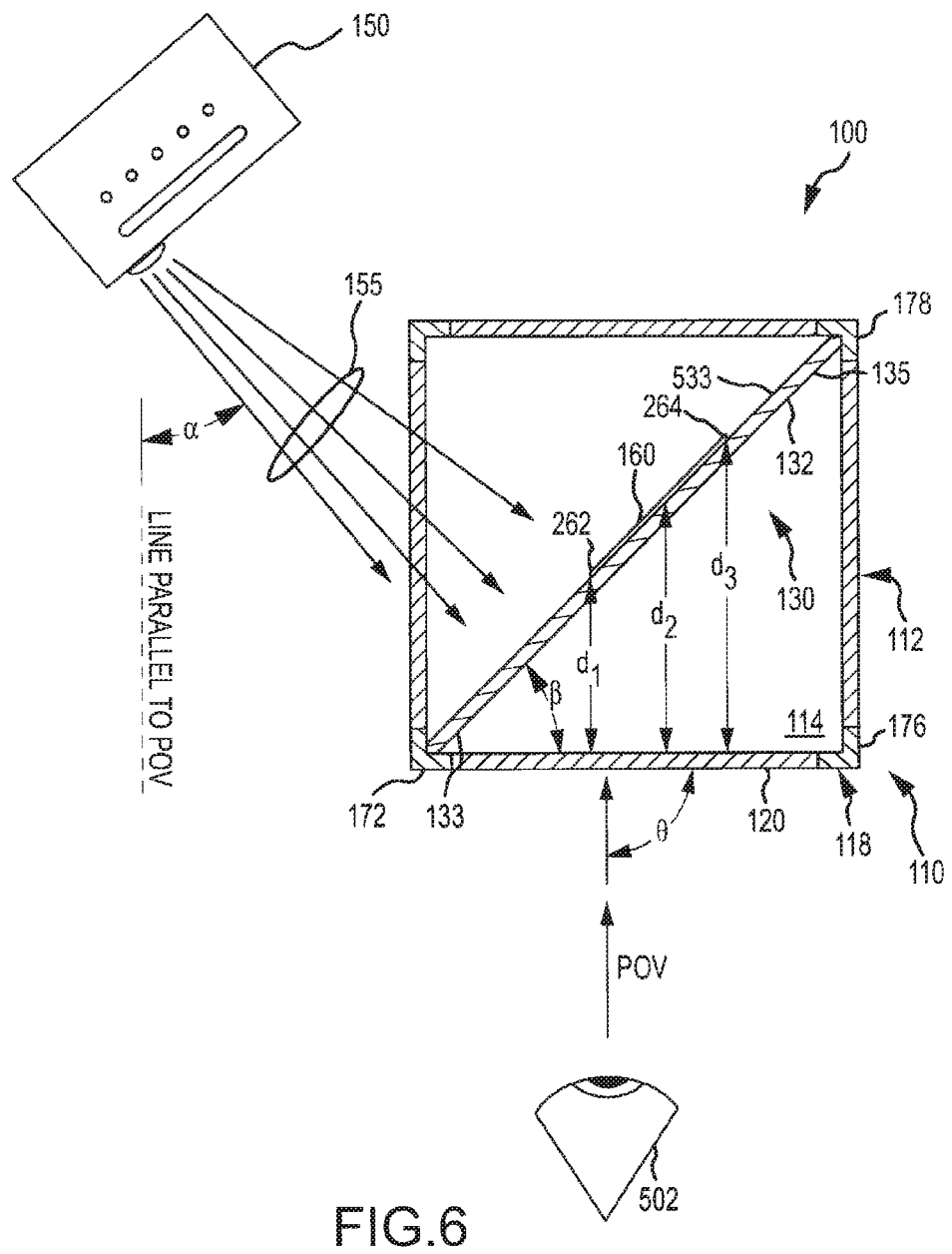

FIG. 6 illustrates another embodiment of display device 100 in which the projection screen 130 is planar or non-curved/arched as shown in FIG. 5. In such an embodiment, the change in depth between the leading edge 262 and trailing edge 264 of the displayed or projected image 160 (e.g., between $d_1$ and $d_3$) is linear. Such an arrangement may be preferred in some cases to achieve a desired 3D or volumetric display.

In other embodiments, set pieces or other techniques are used to create a volumetric display and/or to disguise the edges of screen 130. For example, 2D or 3D objects may be placed between the surface 132 and the front sidewall 120 to provide additional foreground images/elements (in addition to 3D frame elements 172, 176 and so on). In other cases, set elements may be positioned behind the surface 533 of screen 130 such that they are visible to the viewer 502 through the screen 130 when the image 160 is projected upon the projection screen 130 such that the image 160 appears to be in front of the physical set pieces to the viewer 502.

Although the invention has been described and illustrated with a certain degree of particularity, it is understood that the present disclosure has, been made only by way of example, and that numerous changes in the combination and arrangement of parts can be resorted to by those skilled in the art without departing from the spirit and scope of the invention, as hereinafter claimed.

For example, the embodiments of FIGS. 1-6 all included a container, but it will be understood that "open-air" embodiments may also be provided in which the projection screen is supported in a display area or volume. Then, objects or other props and/or a viewing screen spaced apart from the screen may be used to achieve the desired depth effects as well as defining a viewer's line of sight to the projection screen's surfaces while disguising its edges.

Similarly, the projector 150 was shown to be outside the container in the illustrated embodiments, but this is not a requirement or limitation. In some embodiments, the projector (such as one with a wide angle lens) is placed inside the container 110 such as near the base/floor or top/roof of the container to project onto the rear surface of the projection screen 130 at a desired angle. In other embodiments, it is useful to project onto the front surface 132 of the projection screen 130, and, in such cases, the projector 150 (or an additional projector) may be positioned inside or outside the container 110 and target the front surface 132.

Further, FIG. 5 illustrates the screen 130 arranged to be bowed or arched outward toward the front sidewall 120 and viewer 502. In other embodiments, the screen 130 may take other cross sectional shapes or arrangements (in addition to the planar one shown in FIG. 6). For example, the projection screen 130 may be bowed or arched inward away from the front sidewall 120 and viewer 502. In another example, the screen 130 may have one, two, or more waves or curved sections (e.g., take a wave patterns such as sinusoidal wave pattern when viewed from above as in FIGS. 5 and 6) or other patterns that cause the surface 132 to have an non-linear increasing depth from leading end/edge 133 to trailing end/edge 135. The waved or rippled cross section may be useful in producing the effect of motion when media is projected onto it. Further, many of the examples show the projection screen in a vertical or nearly vertical position, but the invention is not limited to such a screen orientation. The projection screen may be positioned to be horizontal, too, or may be positioned at an angle between vertical and horizontal to achieve a desired effect.

Further, to achieve realism and added depth (as well as disguising the use and location of the screen 130), it may be useful to include props or objects within the container or in front/back of the screen 130. For example, with reference to FIG. 5, 3D objects may be placed between the front surface 132 and the front sidewall 120 of the container 110. In one case, these objects may be light generating objects to balance light 155 from the projector 150 or achieve other effects. In one case, a conventional or electric candle or a bulb or LED light or lighted object may be placed in this foreground position. The prop or 3D object may also be positioned proximate to or even abutting the projection screen such that the projected imagery can interact or animate the object. For example, a projection screen may be positioned above a wax (or plastic) candle and the projected image may include a 2D flame, smoke, and the like to animate the unlit candle to achieve a realistic 3D display or illusion. In the cage-type containers, a 3D perch may be positioned near such as below a projection screen, and, in this case, the projected image may be a 2D bird that flies up and lands upon the 3D perch.

We claim:

1. A volumetric display device, comprising:
  a front sidewall providing a viewing window to a viewer viewing the display device;
  a projection screen with a first surface facing the viewing window and spaced apart from the front sidewall; and
  a media source projecting a two dimensional (2D) image onto a second surface of the projection screen,
  wherein the media source is positioned to project onto the second surface in a direction that is oblique to the front sidewall,
  wherein a vertical leading edge of the projection screen is proximate to the front sidewall and a vertical trailing edge of the projection screen is distal to the front sidewall with the first surface angled away from the front sidewall at an angle of at least about 30 degrees,
  wherein the vertical leading edge is one of the left and right side edges of the projection screen, and
  wherein the vertical trailing edge is another one of the left and right side edges of the projection screen.

2. The device of claim 1, wherein the projection screen comprises a transparent rear projection screen, wherein the second surface is a rear surface of the projection screen.

3. The device of claim 1, wherein the projection screen is positioned relative to the front sidewall such that the first surface is angled away from the front sidewall, whereby the front surface is oblique to the viewing window.

4. The device of claim 1, wherein the projection screen is bowed outward away from or bowed inward toward the media source such that the first surface has at least one arched segment in its cross section.

5. The device of claim 1, wherein the 2D image is projected onto the projection screen with a vertical leading edge a first distance from the front sidewall and with a vertical trailing edge a second distance from the front sidewall that is greater than the first distance, whereby the 2D image is projected with two or more depths relative to the viewing window.

6. An apparatus for generating a 3D display to a viewer with a line of sight to the apparatus, comprising:
  a transparent rear projection screen positioned in the interior space with a front surface at an oblique angle to the viewer's line of sight;
  a projector projecting a 2D media stream onto a rear surface of the projection screen; and
  a 3D frame assembly including two or more frame members defining an interior space and supporting a front sidewall that is at least partially transparent to provide the viewer the line of sight into the interior space,
  wherein the projection screen is positioned in the interior space with the front surface at an oblique angle to the front sidewall as measured about a substantially vertical axis of the front sidewall or the projection screen,
  wherein a vertical leading edge of the projection screen is proximate to the front sidewall and a vertical trailing edge of the projection screen is distal to the front sidewall with the front surface angled away from the front sidewall at an angle of at least about 30 degrees,
  wherein the vertical leading edge is one of the left and right side edges of the projection screen, and
  wherein the vertical trailing edge is another one of the left and right side edges of the projection screen.

7. The apparatus of claim 6, wherein the 2D media stream is visible to the viewer on the front surface and has a first portion at a first distance from the front sidewall and a second portion at a second distance from the front sidewall that is greater than the first distance.

8. The apparatus of claim 6, wherein the oblique angle is in the range of about 40 to about 50 degrees as measured from the front sidewall.

9. The apparatus of claim 6, wherein the projector is positioned within the interior space and wherein the 2D media stream comprises a video image.

10. The apparatus of claim 6, wherein the projection screen has a first edge abutting a first frame member and a second edge abutting a second frame member of the 3D frame assembly such that the projection screen extends across the interior space.

11. The apparatus of claim 10, wherein a foreground portion of the 3D frame assembly is positioned in front of the projection screen relative to the viewer and wherein a background portion of the 3D frame assembly is positioned in back of the projection screen and is concurrently visible to the viewer with the projected 2D media stream on the projection screen.

12. The apparatus of claim 6, wherein the front sidewall has a frosted portion defining an outer border of the at least partially transparent area providing the line of sight for the viewer.

13. An apparatus for generating a 3D display using a 2D image projected from a projection device, comprising:
  a 3D frame including a pair of front frame members and at least one rear frame member and further including a transparent front sidewall extending between the front frame members; and
  a transparent rear projection screen extending between one of the front frame members and the rear frame member, the rear projection screen having a front display surface facing the front sidewall and a rear surface receiving the projected 2D image,
  wherein the 2D image is projected toward the rear surface at an angle that is oblique to the front sidewall,
  wherein the rear projection screen is arched about a vertical axis to bow outward toward or inward away from the front sidewall such that the front display surface has an arcuate cross sectional shape,
  wherein the rear projection screen is substantially orthogonal to a base of the 3D frame,
  wherein a vertical leading edge of the rear projection screen is proximate to the front sidewall and a vertical trailing edge of the rear projection screen is distal to the front sidewall with the front display surface angled away from the front sidewall,
  wherein the vertical leading edge is one of the left and right side edges of the rear projection screen, and
  wherein the vertical trailing edge is another one of the left and right side edges of the rear projection screen.

14. The apparatus of claim 13, wherein the rear frame member is positioned in the 3D frame such that the rear projection screen is angled away from the front sidewall by at least about 30 degrees.

15. The apparatus of claim 14, wherein the projected 2D image has a first vertical leading portion that is at a first distance from the front sidewall and a second vertical trailing portion that is at a second distance from the front sidewall that is greater than the first distance, whereby the projected 2D image has depth to a viewer viewing the projected 2D image through the front sidewall.

16. The apparatus of claim 15, wherein the first and second distances differ by at least 1 inch.

* * * * *